(12) United States Patent
Li et al.

(10) Patent No.: US 10,317,521 B2
(45) Date of Patent: Jun. 11, 2019

(54) FREQUENCY DIVERSITY PULSE PAIR DETERMINATION FOR MITIGATION OF RADAR RANGE-DOPPLER AMBIGUITY

(71) Applicant: The United States of America as represented by the Administrator of the National Aeronautics and Space Administration, Washington, DC (US)

(72) Inventors: Lihua Li, Ellicott City, MD (US); Matthew McLinden, Greenbelt, MD (US); Michael Coon, Columbia, MD (US); Gerald Heymsfield, North Potomac, MD (US); Vijay Subbaraman Venkatesh, Annapolis, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 376 days.

(21) Appl. No.: 15/184,048

(22) Filed: Jun. 16, 2016

(65) Prior Publication Data

US 2017/0363715 A1      Dec. 21, 2017

(51) Int. Cl.
*G01S 7/02*          (2006.01)
*G01S 13/58*         (2006.01)
*G01S 13/95*         (2006.01)

(52) U.S. Cl.
CPC ............ *G01S 13/581* (2013.01); *G01S 7/024* (2013.01); *G01S 13/953* (2013.01); *G01S 13/955* (2013.01); *Y02A 90/18* (2018.01)

(58) Field of Classification Search
CPC ........ G01S 13/24; G01S 13/30; G01S 13/282; G01S 13/52; G01S 13/18; G01S 13/4454; G01S 13/581; G01S 13/225; G01S 13/44; G01S 13/13; G01S 13/76; G01S 7/282; G01S 3/74; G01S 13/12; G01S 13/89
See application file for complete search history.

(56) References Cited

U.S. PATENT DOCUMENTS

| | | | | |
|---|---|---|---|---|
| 6,097,329 A * | 8/2000 | Wakayama | ............. | G01S 13/22 342/104 |
| 6,127,965 A * | 10/2000 | McDade | ............... | G01S 13/931 342/104 |
| 6,577,270 B2 * | 6/2003 | Kanechika | ............. | G01S 7/032 342/118 |
| 7,605,744 B1 * | 10/2009 | Karhunen | ............... | G01S 13/22 342/26 R |

(Continued)

*Primary Examiner* — Olumide Ajibade Akonai
(74) *Attorney, Agent, or Firm* — Christopher O. Edwards; Bryan A. Geurts; Mark P. Dvorscak

(57) ABSTRACT

The disclosed subject matter relates to Frequency Diversity Pulse Pair (FDPP) methods and technology implemented by, alternating the order of the pulse pair transmitted or order of the group of multiple pulses transmitted, the pulses differentiated based on the center frequency of each transmitted pulse. For example, where a pair of transmitted pulses have center frequencies $f_1$ and $f_2$, the pulses transmitted in pairs such that the first pair may be $f_1$ followed by $f_2$ and the second pair are a different order, such as $f_2$ followed by $f_1$.

18 Claims, 9 Drawing Sheets

(56) References Cited

U.S. PATENT DOCUMENTS

| | | | |
|---|---|---|---|
| 2004/0125013 A1* | 7/2004 | Haselsteiner | B60R 25/24 342/125 |
| 2009/0051581 A1* | 2/2009 | Hatono | G01S 7/285 342/33 |
| 2016/0033631 A1* | 2/2016 | Searcy | G01S 7/2806 342/132 |

* cited by examiner

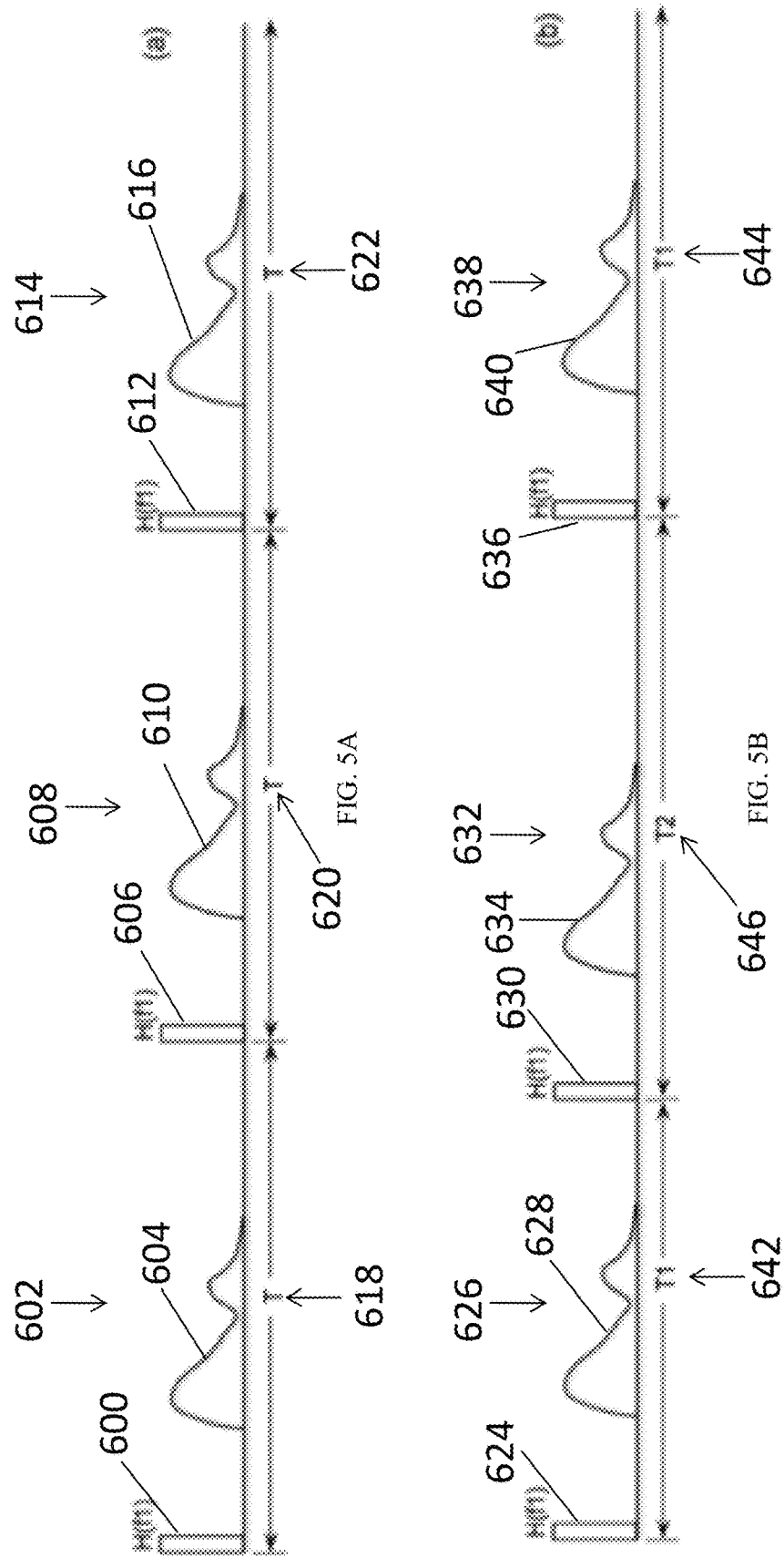

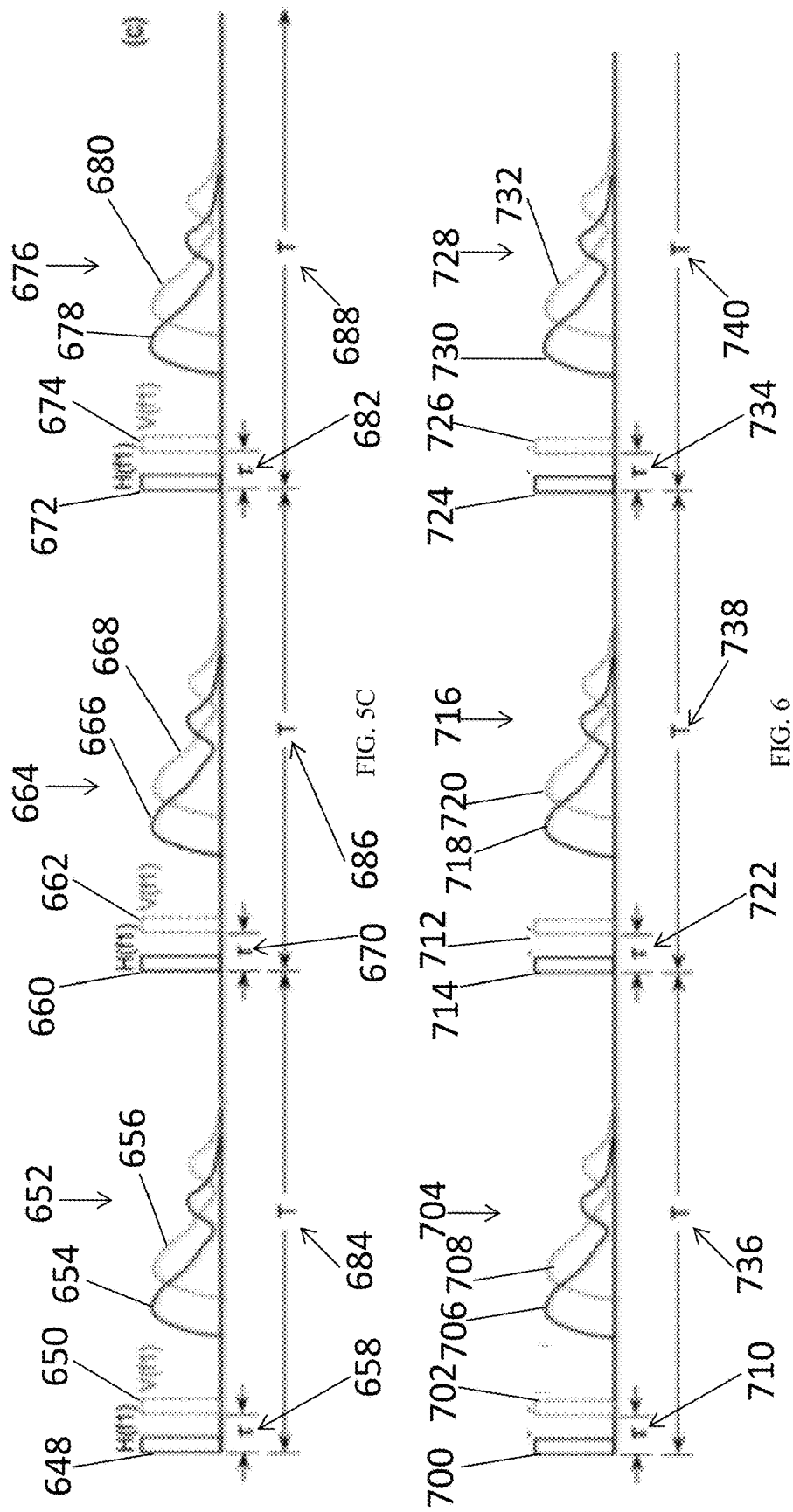

FREQUENCY DIVERSITY PULSE PAIR DETERMINATION FOR MITIGATION OF RADAR RANGE-DOPPLER AMBIGUITY

INVENTION BY GOVERNMENT EMPLOYEE(S) ONLY

The invention described herein was made by an employee of the United States Government, and may be manufactured and used by or for the Government for governmental purposes without the payment of any royalties thereon or therefor.

ORIGIN OF INVENTION

Field

The aspects of the disclosed embodiment relates to Doppler radar technology.

Background

Doppler radar has been the effective tool for detection of moving target range and velocity. However the maximum detectable range and velocity of current radar technology is limited by range-Doppler ambiguity. For atmosphere remote sensing research, Doppler velocity measurements have been especially challenging for radars onboard fast moving platforms (such as spacecrafts including satellites) or radars with rapid scanning antennas due to Doppler spectrum broadening caused by, for example, the ground speed of the spacecraft or motion of the rapid scanning antenna.

Millimeter wave radars have been widely used for atmospheric remote sensing and tracking hard-targets from airborne platforms. In large part, the popularity of these millimeter wave radars is because fine antenna beam widths can be achieved while still allowing for physically small and lightweight designs as well as higher backscattering efficiency for weather targets such as cloud particles. However, the product of the unambiguous range and Doppler velocity is limited by the radar wavelength (i.e. $c\lambda/8$). Airborne millimeter wave radars that are required to have long range coverage, therefore, may have Doppler Nyquist ranges that are much smaller than the relative speeds of objects they are designed to detect, such as an aircraft.

In Doppler radar operation, the maximum unambiguous range is determined by the radar transmission pulse repetition time, T, as $r=CT/2$, where C is the speed of light, r is the range of the target. The radar maximum unambiguous Doppler velocity, $v_n$, is also related to T as $v_n=\lambda/4T$, where $\lambda$ is the radar signal wavelength. Therefore, r and $v_n$ are interrelated as $r*v_n=C\lambda/8$. For a fixed T, r and $v_n$ have to be chosen with compromise to keep within this restriction. Therefore, the Doppler-Range ambiguity dilemma exists for the traditional pulse mode Doppler radars. Different methods, such as "Staggered" Pulse Repetition Time (PRT) and Polarization Diversity Pulse Pair (PDPP), have been used for extending the Doppler measurement range.

The "staggered" PRT is a multi-rate sampling method that determines the Doppler velocity based on the ratio of Doppler velocities measured by 2 or more PRTs. A weakness of this approach is that the resulting Doppler velocity estimates have increased sensitivity to noise, relative to the usage of a single PRT. The Polarization Diverse Pulse-Pair (PDPP) method utilizes two pulses with orthogonal polarizations. These two pulses can be transmitted with a shorter time interval to extend the Doppler Nyquist range, while the PRT can be adjusted independently for range coverage. Polarization isolation between these two orthogonal polarized signals enables the avoidance of the radar range ambiguity.

However, these methods have their intrinsic limits, such as increased phase error ("Staggered PRT") and increased complexity in radar hardware for the transmission and reception of dual polarized signals (PDPP). In addition, finite polarization isolation of the antenna and the radar hardware may result in cross talk between the receiver channels for strong echo signals in PDPP operation.

SUMMARY

The aspects of the disclosed embodiments are directed to a pin alignment fixture. The advantages provided by aspects of the disclosed embodiments are achieved by the subject matter of the independent claims. Further advantageous modifications can be found in the dependent claims.

In one embodiment, a method for operating a radar system. The method includes transmitting at least two pairs of pulses, each pair including center frequencies $f_1$ and $f_2$ and such that the order the pulses $f_1$ and $f_2$ are transmitted is reversed every alternate pair transmission; receiving a corresponding reflection signal as a reception signal after the at least two pairs of pulses are reflected by a point scatterer; and determining the mean radial velocity $v_r$ of the point scatterer from a transmitted waveform and received signal of frequency $f_1$ followed by a transmitted waveform and a received signal of frequency $f_2$ in a first pulse pair and a transmitted waveform and received signal of frequency $f_2$ followed by a transmitted waveform and a received signal of frequency $f_1$ in a second pulse pair where the first and second pulse pairs are transmitted in succession.

In another embodiment, a method for operating a radar system. The method includes transmitting at least two pairs of pulses, each pair including center frequencies $f_1$ and $f_2$ and such that the order the pulses $f_1$ and $f_2$ are transmitted is reversed every alternate pair transmission; receiving a corresponding reflection signal as a reception signal after the at least two pairs of pulses are reflected by a point scatterer; and determining the mean radial velocity $v_r$ where $v_r=c\Delta\Phi/(4\pi(f_1+f_2))$, c is the speed of light, $\Delta\Phi=\Delta\Phi_{order1}+\Delta\Phi_{order2}$, and $\Delta\Phi_{order1}$ and $\Delta\Phi_{order2}$ determined using pulse pair algorithm and measurements obtained by $f_1/f_2$ and $f_2/f_1$ pulse pairs as $\Delta\Phi_{order1}=\arg(E_{Rx,f1}(t)E^*_{Rx,f2}(t+\Delta T))$, and $\Delta\Phi_{order2}=\arg(E_{Rx,f2}(t)E^*_{Rx,f1}(t+\Delta T))$.

In another embodiment, a radar system. The radar system includes a transceiver, a radar antenna and a digital receiver/processor. The transceiver is configured to generate at least two pairs of pulses, each pair including center frequencies $f_1$ and $f_2$ and such that the order the pulses $f_1$ and $f_2$ are transmitted is reversed every alternate pair transmission. The radar antenna is connected to the transceiver to (1) receive from the transceiver and transmit the at least two pairs of pulses and (2) receive and transmit to the transceiver a corresponding reflection signal after the at least two pairs of pulses are reflected by a point scatterer. The digital receiver/processor is connected to the transceiver to receive the reflection signals and configured to determine the mean radial velocity $v_r$ of the point scatterer from a transmitted waveform and received signal of frequency $f_1$ followed by a transmitted waveform and a received signal of frequency $f_2$ in a first pulse pair and a transmitted waveform and received signal of frequency $f_2$ followed by a transmitted waveform and a received signal of frequency $f_1$ in a second pulse pair where the first and second pulse pairs are transmitted in succession.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following, the invention will be explained in more detail with reference to the example embodiments shown in the drawings, in which:

FIG. 5A illustrates a traditional pulse pair (PP) Doppler radar transmit and receive signal time sequence;

FIG. 5B illustrates dual-PRT pulse pair (DPP), a special case of Staggered PRT Doppler radar transmit and receive signal time sequence;

FIG. 5C illustrates polarization diverse pulse pair (PDPP) Doppler radar transmit and receive signal time sequence; and FIG. 6 illustrates an embodiment of the FDPP technology.

Figure 1:
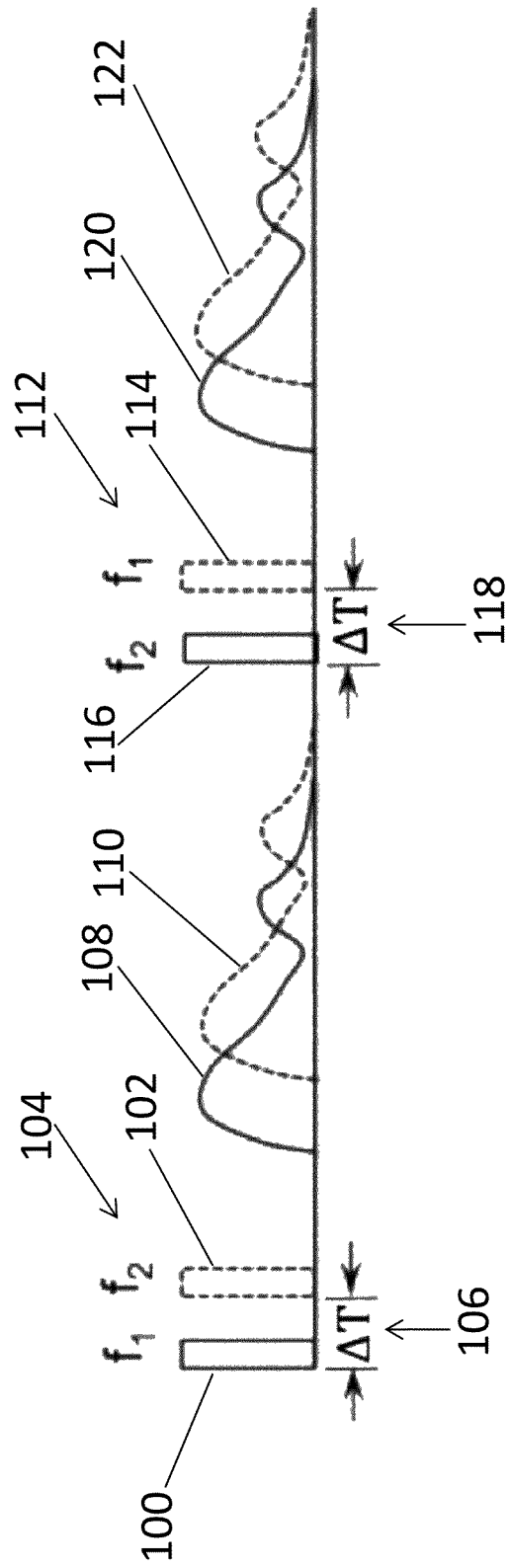
FIG. 1 illustrates an embodiment of the FDPP technology.

The patent or application file contains at least one drawing executed in color. Copies of this patent or patent application publication with color drawing(s) will be provided by the Office upon request and payment of the necessary fee.

DETAILED DESCRIPTION OF THE DISCLOSED EMBODIMENTS

The present disclosure relates to utilizing a frequency diverse pulse-pair (FDPP) determination method and embodiments incorporating such technology, for example, using frequency diversity pulse-pairs for Doppler phase estimation to extend the Doppler Nyquist range or rate of millimeter radars without causing range ambiguity. This method and technology have potential application in many areas such as spaceborne, airborne and ground-based weather radar, air traffic control, commercial collision avoidance system and defense related high speed moving target detection.

To increase a radar unambiguous Doppler velocity range, the time interval between two adjacent pulses, $\Delta T$, has to be small. However, a small $\Delta T$ may result in a short unambiguous range. The FDPP determination method and technology of the embodiments described herein utilize digital waveform generation and digital receiver technologies whereby, for example, a pair of pulses is transmitted with slightly shifted center frequencies in each pulse repetition period. More than two pulses, each with different shifted center frequencies, may also be utilized in the embodiments described herein. Radar return signals from these pulses can be separated by digital filters implemented in a digital receiver. As a result, since $\Delta T$ can be as small as needed, Doppler Nyquist then can be increased to a desired range without causing range ambiguity. However, since the frequency separation between the pulse pair is preferably at least several MHz so that the digital filter can separate them, the radar return signals from these pulses are likely decorrelated, which makes Doppler phase estimate unpractical.

The present disclosure includes embodiments involving systems and methods to minimize this effect. In one embodiment, the Frequency Diversity Pulse Pair (FDPP) method described herein is implemented by, for example, alternating the order of the pulse pair transmitted or order of the group of multiple pulses transmitted, the pulses differentiated based on the center frequency of each transmitted pulse. For example, where a pair of transmitted pulses have center frequencies $f_1$ and $f_2$, the pulses are transmitted in pairs such that the first pair may be $f_1$ followed by $f_2$ and the second pair may be a different order, such as $f_2$ followed by $f_1$. To elaborate further on the embodiment, two pulses at center frequencies of $f_1$ and $f_2$ are transmitted separated by a lag time of $\Delta T$. While retaining $\Delta T$, the order of the pulses is reversed every alternate transmission. From the receive channels at $f_1$ and $f_2$, the pulse-pair phase estimate of the two sequences are individually accumulated and stored as $\Delta\phi_{order1}$ and $\Delta\phi_{order2}$. Finally Doppler velocity is estimated from the sum of an equal number of the two individual pulse-pair phase estimates (denoted as $\Delta\phi$).

FIG. 1 illustrates an embodiment of the FDPP determination method. In FIG. 1 where two short pulses with center-frequencies of $f_1$ 100 and $f_2$ 102 are transmitted in the order of $f_1$ 100 followed by $f_2$ 102 during the first pulse repetition interval (PRI) 104. Transmission of $f_1$ 100 and $f_2$ 102 are separated by $\Delta T$ 106 in PRI 104. Return signal 108 is the returned echo of $f_1$ 100 and return signal 110 is the returned echo of $f_2$ 102, both occurring subsequently to the transmission of $f_1$ 100 and $f_2$ 102 and as a result of the reflection by a point scatterer (object) of $f_1$ 100 and $f_2$ 102. In the next PRI 112, two short pulses with center-frequencies of $f_1$ 114 and $f_2$ 116 are transmitted in the order of $f_2$ 116 followed by $f_1$ 114. Transmission of $f_1$ 114 and $f_2$ 116 are separated by $\Delta T$ 118 in PRI 112. Return signal 120 is the returned echo of $f_2$ 116 and return signal 122 is the returned echo of $f_1$ 114, both occurring subsequently to the transmission of $f_1$ 114 and $f_2$ 116 and as a result of the reflection by a point scatterer (object) of $f_2$ 116 and $f_1$ 114.

The use of two closely spaced radar frequencies can introduces two sources of error, however, two mechanisms of error cancellation are utilized in the embodiments disclosed herein. First, a "beat" phase that scales as a function of range can be introduced. However, this term vanishes when the phases of the $f_1/f_2$ pair and $f_2/f_1$ pairs are added together, thus, canceling out the expected value sense. Second, since there is little correlation between the $f_1$ and $f_2$ pulses, the variances of the $f_1/f_2$ phase estimates may be large. However, since the $f_1/f_2$ and $f_2/f_1$ phase estimates are highly anticorrelated, the sum of the two phase estimates has a much smaller variance than the individual phase estimates. As a result of the FDPP determination and integration of the phase estimates of $f_1/f_2$ pulse pair and $f_2/f_1$ pulse pair in equal numbers, the phase shift as a function of range between two pulses is canceled to enable the retrieval of Doppler phase.

Figure 2:
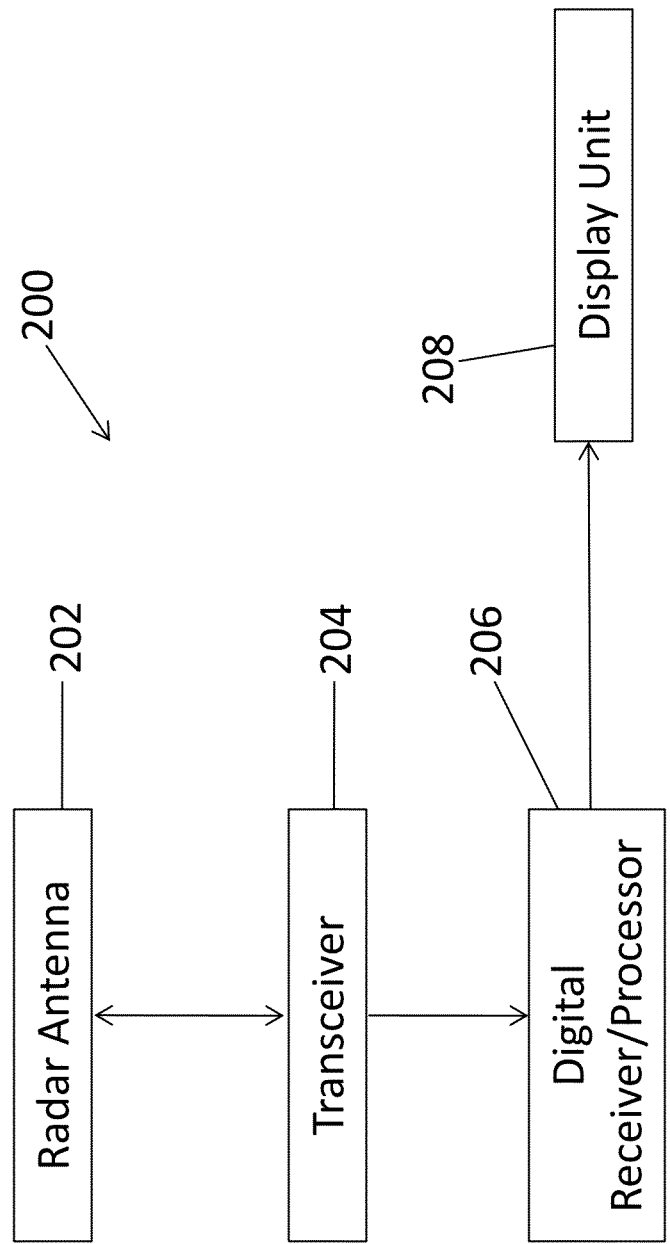
FIG. 2 illustrates a block diagram of an exemplary radar apparatus.

In at least one aspect of the disclosed embodiments, the methods disclosed herein may be executed using a radar system 200, for example, shown in FIG. 2. Radar system 200 includes a radar antenna 202 that transmits a microwave transmission signal and receives a corresponding echo (a reception signal, a reflection signal) from a point scatterer (a target object) located in a given range from the radar antenna 202. The radar antenna 202 repeats transmission and reception and may be rotating in, for example, a horizontal plane at a predetermined cycle while positioned on a stationary (e.g., land based) or moving (e.g., spacecraft including satellites, aircraft) platform. The transceiver 204 (transmitter/receiver) includes a digital waveform generator. The transceiver 204 sends a transmission signal to the radar antenna 202 based on a signal generated by the digital waveform generator. Transceiver 204 also receives the echo signal, down converts it to Intermediate Frequency (IF), and then sends the signal at IF to the digital receiver/processor 206. Digital receiver/processor 206 includes a digital filter that receives a reception signal and separates the reception signals based on frequency before it is sent to the processor of the digital receiver/processor 206. The processor of the digital receiver/processor 206 may determine the position of the point scatterer and may determine a velocity estimate of the point scatterer utilizing the Frequency Diversity Pulse-Pair (FDPP) determination, integration of the phase estimates of $f_1/f_2$ pulse pair and $f_2/f_1$ pulse pair and other data analysis utilized in the embodiments disclosed herein. A display unit 208 (such as, for example, a CRT monitor or plasma or liquid crystal monitor) is connected to the processor of the digital receiver/processor 206 and may include a screen or other devices (such as, for example, a CRT monitor or plasma or liquid crystal monitor) to provide a visual image for the radar system and show the position and/or velocity estimate of the point scatterer as determined by the processor using the Frequency Diversity Pulse-Pair (FDPP) determination, integration of the phase estimates of $f_1/f_2$ pulse pair and $f_2/f_1$ pulse pair and other data analysis utilized in the embodiments disclosed herein.

Figure 3:
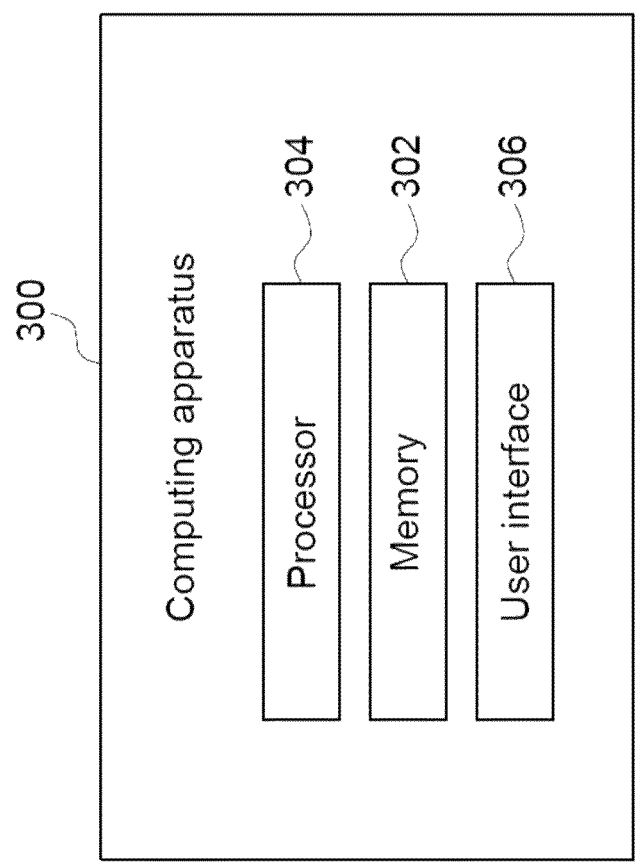
FIG. 3 illustrates a block diagram of an exemplary computing/processor apparatus included in the digital receiver/processor.

In at least one aspect of the disclosed embodiments, the systems and methods disclosed herein may be executed by one or more computers or processor-based components under the control of one or more programs stored on computer readable medium, such as a non-transitory computer readable medium. FIG. 3 shows a block diagram of an exemplary computing apparatus 300 that may be used to practice aspects of the disclosed embodiment. In at least one exemplary aspect, the digital receiver/processor and other disclosed devices, components and systems may be implemented using an instance or replica of the computing apparatus 300 or may be combined or distributed among any number of instances or replicas of computing apparatus 300.

The computing apparatus 300 may include computer readable program code or machine readable executable instructions (such as, for example, the Frequency Diversity Pulse-Pair (FDPP) determination, integration of the phase estimates of $f_1/f_2$ pulse pair and $f_2/f_1$ pulse pair and other data analysis utilized in the embodiments disclosed herein) stored on at least one computer readable medium 302, which when executed, are configured to carry out and execute the processes and methods described herein, including all or part of the embodiments of the present disclosure. The computer readable medium 302 may be a memory of the computing apparatus 300. In alternate aspects, the computer readable program code may be stored in a memory external to, or remote from, the apparatus 300. The memory may include magnetic media, semiconductor media, optical media, or any media which may be readable and executable by a computer. Computing apparatus 300 may also include a processor 304 for executing the computer readable program code (such as, for example, the Frequency Diversity Pulse-Pair (FDPP) determination, integration of the phase estimates of $f_1/f_2$ pulse pair and $f_2/f_1$ pulse pair and other data analysis utilized in the embodiments disclosed herein) stored on the at least one computer readable medium 302. In at least one aspect, computing apparatus 300 may include one or more input or output devices to allow communication among the components of the exemplary radar system, including, for example, what may be generally referred to as a user interface 306, such as, the operator workstation described above, which may operate the other components included in the Doppler radar system or to provide input or output from the computing apparatus 300 to or from other components of the Doppler radar system. User interface 306 may include display unit 208 included in the embodiment of FIG. 2.

In another embodiment of the FDPP determination, the transmitted waveform at frequency $f_1$ is denoted as $E_{Tx,f1}(t)=E_{0,f1}\cos[2\pi f_1 t+\Psi_{Tx,f1}]$, where $E_{0,f1}$ is the amplitude of the transmitted signal, the phase of the transmitted signal is $\Psi_{Tx,f1}$ and t denotes time. The received signal $E_{Rx,f1}$ at time t, where c is the speed of light, $f_{D1}$ is the Doppler shift of $f_1$, $A_{f1}$ is the backscatter ratio of $f_1$ and R the range to a point scatterer, can be written as $E_{Rx,f1}(t)=A_{f1}E0_{,f1}\cos[2\pi f_1(t+2R/c)+2\pi f_{D1}(t+R/c)+\Psi_{Tx,f1}]$.

Similarly, Tx and Rx signals at frequency $f_2$ and transmitted at time $t+\Delta T$ can be written as follows, where the range to the point-scatter is $R+v_r\Delta T$ where $v_r$ is the radial velocity of the point-scatter, $f_{D2}$ is the Doppler shift of $f_2$, and $A_{f2}$ is the backscatter ratio of $f_2$, $E_{Tx,f2}(t)=E_{0,f2}\cos[2\pi f_2 t+\Psi_{Tx,f2}]$ and $E_{Rx,f2}(t+\Delta T)=A_{f2}E0_{,f2}\cos[2\pi f_2(t+2(R+v_r\Delta T)/c)+2\pi f_{D2}(t+(R+v_r\Delta T)/c)+\Psi_{Tx,f2}]$.

Assuming $A_{f1}=A_{f2}$ (where A is the backscatter ratio), $E_{0,f1}=E_{0,f2}$, $f_1\gg f_{D1}$ (where $f_{D1}$ is the Doppler shift for $f_1$) and $f_2\gg f_{D2}$ (where $f_{D2}$ is the Doppler shift for $f_2$), the echo phase change $\phi_{Rx}-\phi_{Tx}$ for frequencies $f_1$ and $f_2$ are denoted as $\Phi_{f1}$ and $\Phi_{f2}$, respectively are $$\Phi_{f1}=2\pi f_1(t+2R/c)+2\pi f_{D1}(t+R/c)+\Psi_{Tx,f1}-2\pi f_1 t-\Psi_{Tx,f1}$$

$$\Phi_{f1}=2\pi f_1(2R/c)+2\pi f_{D1}(t+R/c)$$

$$\Phi_{f2}=2\pi f_2[t+2(R+v_r\Delta T)/c]+2\pi f_{D2}[t+(R+v_r\Delta T)/c]+\Psi_{Tx,f2}-2\pi f_2 t-\Psi_{Tx,f2}$$

$$\Phi_{f2}=2\pi f_2(2(R+v_r\Delta T)/c)+2\pi f_{D2}[t+(R+v_r\Delta T)/c]$$

The FDPP determination is based on 2 quantities $\Delta\Phi_{order1}$ and $\Delta\Phi_{order2}$. Here $\Delta\Phi_{order1}=\Phi_{f2}-\Phi_{f1}$ and $\Delta\Phi_{order2}=\Phi_{f1}-\Phi_{f2}$.

$$\Delta\Phi_{order1}=4\pi(f_2-f_1)R/C+2\pi(2f_2+f_{D2})v_r\Delta T/c$$

Similarly, $$\Delta\Phi_{order2}=4\pi(f_1-f_2)R/C+2\pi(2f_1+f_{D2})v_r\Delta T/c$$

$$\Delta\Phi=\Delta\Phi_{order1}+\Delta\Phi_{order2}$$

Since $f_{D1}\approx f_{D2}$, using $f_D$ to replace $f_{D1}$ and $f_{D2}$, $\Delta\Phi=4\pi(f_1+f_2+f_D)v_r\Delta T/c$ Since $f_1\gg f_D$ and $f_2\gg f_D$, $\Delta\Phi=4\pi(f_1+f_2)v_r\Delta T/c$ $$v_r=c\Delta\Phi/(4\pi(f_1+f_2)\Delta T)$$

Since all values other than $v_r$ are solely system dependent, the radial component of target (point scatterer) mean radial velocity $v_r$ of the point scatterer can be obtained once the ensemble-averaged $\Delta\Phi$ is determined. In one embodiment, a "Pulse Pair (PP)" method can be used to calculate the phase change between the return signals of an $f_1/f_2$ pulse pair and an $f_2/f_1$ pulse pair. The calculated phase change can then be used to determine $\Delta\Phi$. PP is a method for weather radar Doppler phase estimate and D. S. Zrnic, *Spectral Moment Estimates from Correlated Pulse Pairs*, IEEE Transactions on Aerospace and Electronic Systems, Vol. AES-13, No. 4, 344-354, July 1977 related thereto is hereby incorporated by reference.

In Pulse Pair processing, phase change $\Delta\Phi_{order1}$ of pulse pair $f_1/f_2$ and $\Delta\Phi_{order2}$ of pulse pair $f_2/f_1$ are calculated using autocorrelation function of the radar return signals as $\Delta\Phi_{order1}=\arg(R_{f1,f2}(\Delta T))$ and $\Delta\Phi_{order2}=\arg(R_{f2,f1}(\Delta T))$, where $R_{f1,f2}(\Delta T)=E_{Rx,f1}(t)E^*_{Rx,f2}(t+\Delta T)$ and $R_{f2,f1}(\Delta T)=E_{Rx,f2}(t)E^*_{Rx,f1}(t+\Delta T)$ are the autocorrelation functions of pulse pair $f_1/f_2$ and $f_2/f_1$, respectively (note: $E_{Rx,f1}(t)$, $E_{Rx,f2}(t+\Delta T)$, $E_{Rx,f2}(t)$, and $E_{Rx,f1}(t+\Delta T)$ are radar received signals defined in previous sections.).

$$\Delta\Phi=\Delta\Phi_{order1}+\Delta\Phi_{order2}=\arg(E_{Rx,f1}(t)E^*_{Rx,f2}(t+\Delta T))+\arg(E_{Rx,f2}(t)E^*_{Rx,f1}(t+\Delta T))$$

In an embodiment disclosed herein, frequencies $f_1$ and $f_2$ may be in the range of, for example, from about 75 GHz to about 110 GHz preferably about 95 GHz (W-band); from about 26.5 GHz to about 40 GHz preferably about 35.5 GHz (Ka-band); from about 12 GHz to about 18 GHz preferably about 13.6 GHz (Ku-band); and from about 8 GHz to about 12 GHz preferably about 9.6 GHz (X-band). Radars that may be utilized to implement the embodiments disclosed herein may be built to measure the backscattering signal from cloud particles and rain drops. They may include narrow band sensors (for example, instantaneous bandwidth<10 MHz in order to maximize the signal to noise ratio) and the operational frequencies (for example, 95 GHz/35.5 GHz/13.6 GHz/9.6 GHz) at each band may chosen at the atmospheric absorption window (to minimize the atmospheric attenuation).

In the embodiment disclosed herein, the frequency separation between the center frequencies of $f_1$ and $f_2$ (the value of $\Delta f=f_1-f_2$) may be from about 2 MHz to about 10 MHz preferably about 6 MHz. If $\Delta f$ is too small, then the digital filter implemented in the digital receiver may limit the separation of the returns from the $f_1$ pulse and the $f_2$ pulse. If $\Delta f$ is too large, the return signals at $f_1$ and $f_2$ may be decorrelated and difficult to estimate the Doppler phase using the FDPP method. In the embodiment disclosed herein, $\Delta T$ can be preferably between about 10 microseconds and about 100 microseconds preferably about 30 microseconds, airborne radar may be closer to the lower end of the range and land based radar may be closer to the higher end of the range. In the embodiment disclosed herein, pulse repetition time may be in the range of from about 3 KHz to about 6 KHz preferably about 5 KHz, airborne radar may be closer to the higher end of the range and land based radar may be closer to the lower end of the range.

In order to determine the confidence in the above calculations, $\sigma$ denoting variance and $\rho$ denoting the correlation operators were determined.

$$\sigma(\Delta\Phi)=\sigma(\Delta\Phi_{Order1})+\sigma(\Delta\Phi_{Order2})+2\text{Cov}(\Delta\Phi_{order1},\Delta\Phi_{order2})$$

Next, the covariance term is decomposed as $$\text{Cov}(\Delta\Phi_{Order1},\Delta\Phi_{Order2})=\rho(\Delta\Phi_{Order1},\Delta\Phi_{Order2})\cdot\sqrt{\Delta\Phi\text{Order1}\cdot\sigma(\Delta\Phi\text{Order2})}$$

Where $\sigma(\Delta\Phi_{Order1})=\sigma(\Delta\Phi_{Order2})$ $$\text{Cov}(\Delta\Phi_{Order1},\Delta\Phi_{Order2})=\rho(\Delta\Phi_{Order1},\Delta\Phi_{Order2})\cdot\sigma(\Delta\Phi_{Order1})$$

From the above relationships $$\sigma(\Delta\Phi)=2\sigma(\Delta\Phi_{Order1})+2\rho(\Delta\Phi_{Order1},\sigma(\Delta\Phi_{Order2})\cdot\sigma(\Delta\Phi_{Order1})$$

After rearranging terms in the above equation $$\sigma(\Delta\Phi)=2\sigma(\Delta\Phi_{Order1})[1+\rho(\Delta\Phi_{Order1},\sigma(\Delta\Phi_{Order2})]$$

Therefore, the underlying premise of the FDPP determination is that as $\rho(\Delta\Phi_{Order1},\sigma(\Delta\Phi_{Order2})\rightarrow-1$, the variance of the phase composite estimate $\sigma(\Delta\Phi)\rightarrow 0$.

Figure 4A:
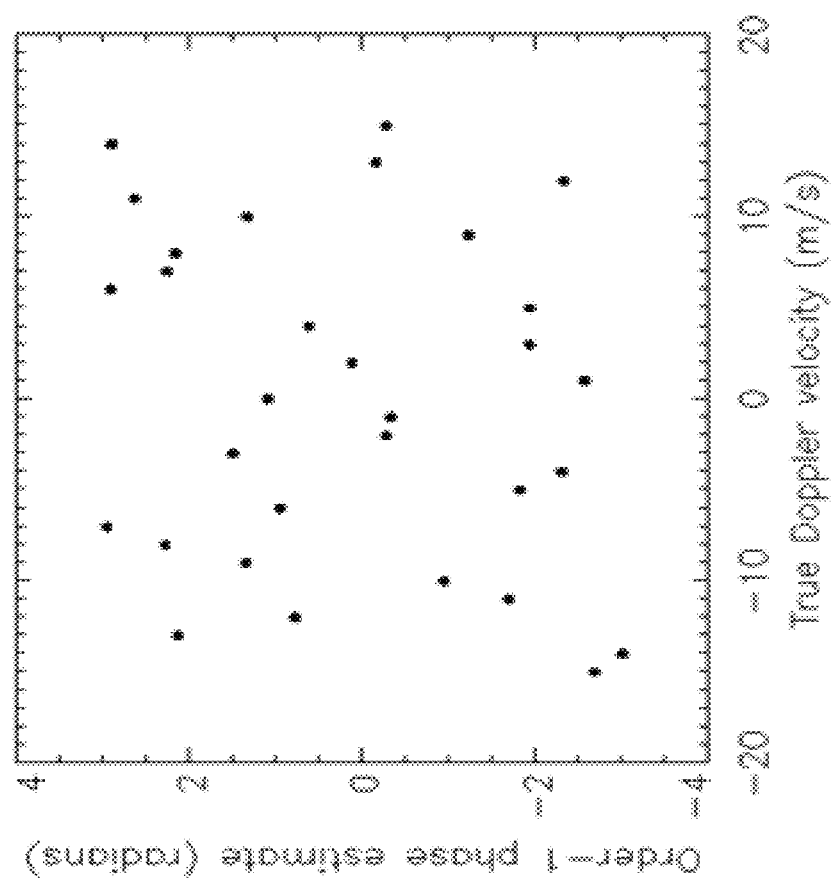
FIG. 4A-4D illustrate simulations of the FDPP Doppler velocity retrieval process.
Figure 4B:
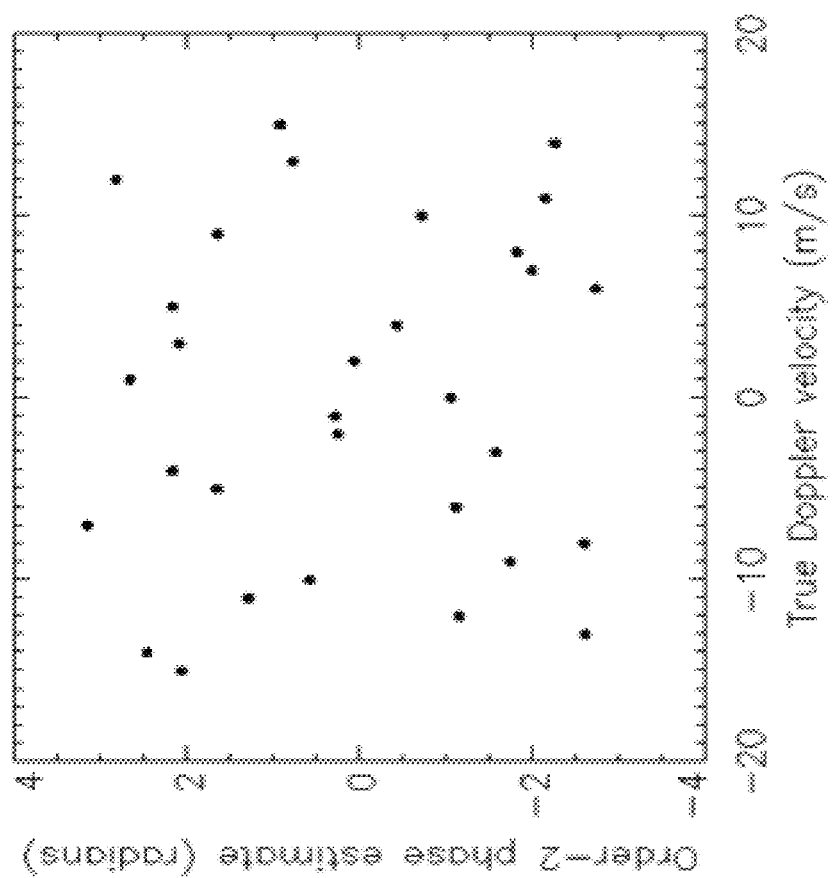
Figure 4C:
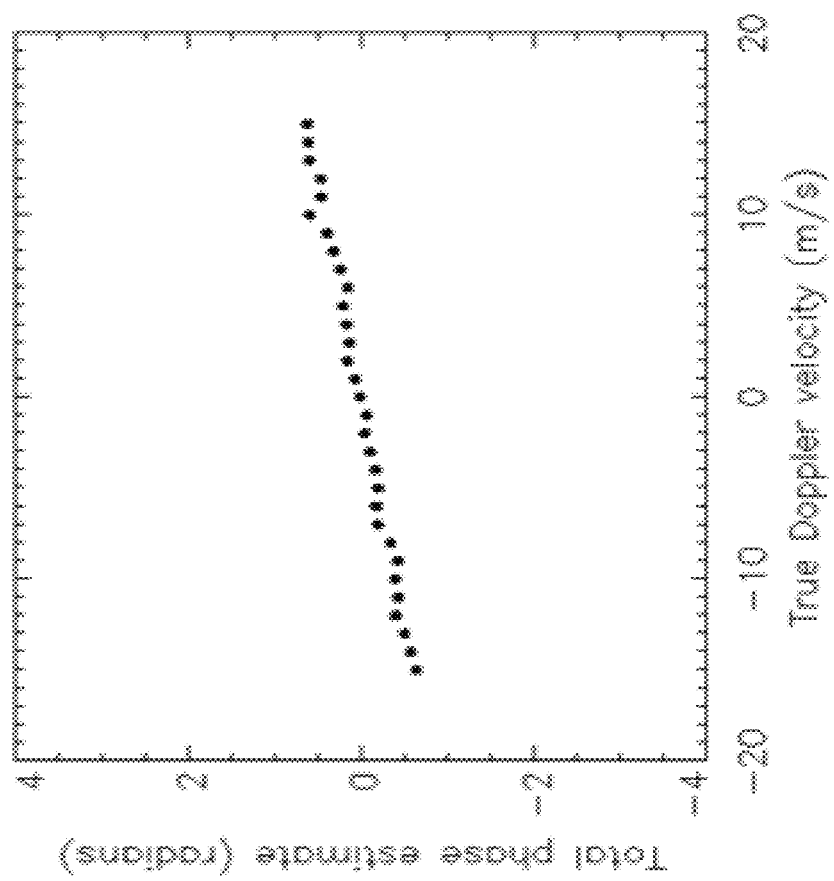
Figure 4D:
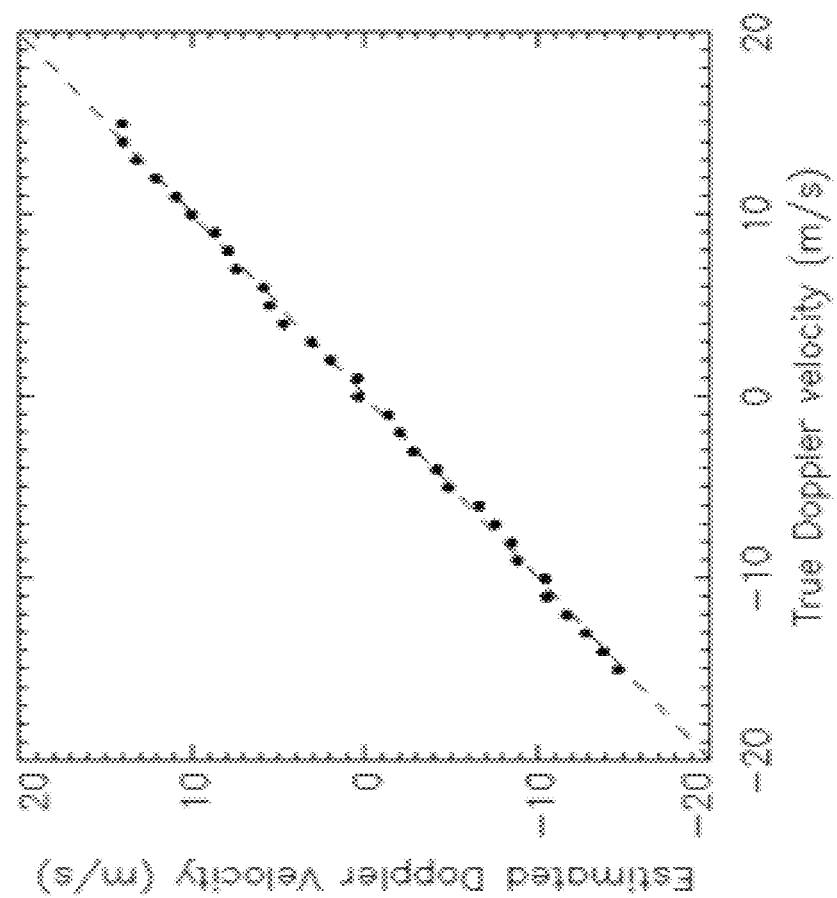

Monte-Carlo simulations were qualitatively compared with data-analysis results (all at W-band). FIG. 4A-4D show simulations of the FDPP Doppler velocity retrieval process. In them, a composite phase that is solely Doppler dependent is synthesized from noisy but highly anticorrelated frequency diverse pulse-pair lag-1 phase estimates. The phase estimate from the sequence in which $f_1$ leads $f_2$ is shown in FIG. 4A. After 1 PRT, the sequence of $f_2$ followed by $f_1$ is yields phase estimates shown in FIG. 4B. The sum of the two frequency diverse pulse-pair estimates is shown in FIG. 4C. FIG. 4D shows a scaled version of FIG. 4C, where the composite phase is scaled to the Doppler Nyquist interval.

System benefits and improvements of the embodiments of the present disclosure include the following: (1) enabling Doppler radar to detect target velocity and range with extended ambiguity range; (2) lower-cost and lighter weight Doppler velocity retrievals on air-borne millimeter wave radars; and (3) being a cost effective approach to mitigate the range-Doppler ambiguity limit without the need of significant investment in hardware. It has broad potential application in spaceborne, airborne and ground-based Doppler weather radar, spacecraft landing control, air traffic control, high speed moving target detection and collision avoidance, as well as weather radar, airport traffic control radar, aviation and auto collision avoidance system, and high speed moving target detection such as aircraft or missile. As a result of the above, the embodiments disclosed herein to extend the Doppler Nyquist range or rate of millimeter radars without causing range ambiguity and permit Doppler measurements from a rapid moving platform, such as spacecraft, or radars using fast scanning antennas that had been especially challenging due to spectrum broadening and rapid decorrelation between successive radar transmission pulses.

FIG. 5A illustrates the Doppler radar determination using a traditional pulse pair (PP) method. In FIG. 5A, a short pulse with center-frequency of $f_1$ 600 is transmitted during pulse repetition interval (PRI) 602 followed by return signal 604, a short pulse with center-frequency of $f_1$ 606 is transmitted during pulse repetition interval (PRI) 608 followed by return signal 610 and a short pulse with center-frequency of $f_1$ 612 is transmitted during pulse repetition interval (PRI) 614 followed by return signal 616, where T 618, T 620 and T 622 indicating time interval are substantially equal. The PP method utilizes a pulse pair having the same center frequencies and same polarization, but the time interval T determined by the measurement range cannot be too small or the Doppler range is small and the signal is decorrellated due to motion such as for radars onboard fast moving platforms (such as spacecrafts including satellites).

FIG. 5B illustrates the Doppler radar determination using dual-PRT pulse pair (DPP) (also known as Dual Pulse Repetition Frequency (PRF)) method. In FIG. 5B, a short pulse with center-frequency of $f_1$ 624 is transmitted during pulse repetition interval (PRI) 626 followed by return signal 628, a short pulse with center-frequency of $f_1$ 630 is transmitted during pulse repetition interval (PRI) 632 followed by return signal 634 and a short pulse with center-frequency of $f_1$ 636 is transmitted during pulse repetition interval (PRI) 638 followed by return signal 640, where T1 642 and T1 644 indicating time interval are substantially equal and T2 646 indicating time interval is different from T1 640 and T1 642. The DPP method utilizes a pulse pair with the same center frequencies and the same polarization and it can extend a Doppler measurement range without range ambiguity, but the time interval T cannot be too small and the signal is decorrellated due to motion such as for radars onboard fast moving platforms (such as spacecrafts including satellites).

FIG. 5C illustrates the Doppler radar determination using Polarization Diverse Pulse Pair (PDPP) method. In FIG. 5C, two short pulses with the same center-frequency of $f_1$ 648 and $f_1$ 650, but orthogonal polarizations are transmitted during pulse repetition interval (PRI) 652 followed by return signal 654 of $f_1$ 648 and return signal 656 of $f_1$ 650, transmission of $f_1$ 648 and $f_1$ 650 are separated by $\tau$ 658 in PRI 652; two short pulses with the same center-frequency of $f_1$ 660 and $f_1$ 662, but orthogonal polarizations are transmitted during pulse repetition interval (PRI) 664 followed by return signal 666 of $f_1$ 660 and return signal 668 of $f_1$ 662, transmission of $f_1$ 660 and $f_1$ 662 are separated by $\tau$ 670 in PRI 664; and two short pulses with the same center-frequency of $f_1$ 672 and $f_1$ 674 are transmitted during pulse repetition interval (PRI) 676 followed by return signal 678 of $f_1$ 672 and return signal 680 of $f_1$ 674, transmission of $f_1$ 672 and $f_1$ 674 are separated by $\tau$ 682 in PRI 676. T 684, T 686 and T 688 indicating time interval are substantially equal. $\tau$ 658, $\tau$ 670 and $\tau$ 682 are substantially equal ($\tau$ denotes pulse pair time interval). The PDPP method utilizes a pulse pair time interval that may be small along with a high immunity to SNR, but there is a need to transmit and receive both H and V polarizations resulting in the need for complex radar hardware and poor channel isolation with a maximum cross-polarization isolation of about 30 dB.

FIG. 6 illustrates the Doppler radar determination using FDPP. In FIG. 6, two short pulses with different center-frequencies of $f_1$ 700 and $f_2$ 702 are transmitted in the order of $f_1$ 700 followed by $f_2$ 702 during pulse repetition interval (PRI) 704 followed by return signal 706 of $f_1$ 700 and return signal 708 of and $f_2$ 702, transmission of $f_1$ 700 and $f_2$ 702 are separated by $\tau$ 710 in PRI 704; two short pulses with different center-frequencies of $f_1$ 712 and $f_2$ 714 are transmitted in the order of $f_2$ 714 followed by $f_1$ 712 during pulse repetition interval (PRI) 716 followed by return signal 718 of $f_2$ 714 and return signal 720 of $f_1$ 712, transmission of $f_1$ 712 and $f_2$ 714 are separated by $\tau$ 722 in PRI 716; and two short pulses with different center-frequencies of $f_1$ 724 and $f_2$ 726 are transmitted in the order of $f_1$ 724 followed by $f_2$ 726 during pulse repetition interval (PRI) 728 followed by return signal 730 of $f_1$ 724 and return signal 732 of $f_2$ 726, transmission of $f_1$ 724 and $f_2$ 726 are separated by $\tau$ 734 in PRI 728. T 736, T 738 and T 740 indicating time interval are substantially equal and $\tau$ 710, $\tau$ 722 and $\tau$ 734 are substantially equal ($\tau$ denotes pulse pair time interval). The FDPP method and embodiments incorporating such technology utilize a pulse pair time interval ($\tau$) that can be relatively small in order to extend the Doppler range, less complex hardware can be used (no need to transmit and receive both H and V polarizations) and lower immunity to SNR.

While there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit or scope of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a radar system, comprising:
   a. transmitting at least two pairs of pulses, each pair including center frequencies $f_1$ and $f_2$ and such that the order the pulses $f_1$ and $f_2$ are transmitted is reversed every alternate pair transmission;
   b. receiving a corresponding reflection signal as a reception signal after the at least two pairs of pulses are reflected by a point scatterer; and
   c. determining the mean radial velocity $v_r$ of the point scatterer from a transmitted waveform and received signal of frequency $f_1$ followed by a transmitted waveform and a received signal of frequency $f_2$ in a first pulse pair and a transmitted waveform and received signal of frequency $f_2$ followed by a transmitted waveform and a received signal of frequency $f_1$ in a second pulse pair where the first and second pulse pairs are transmitted in succession;
   wherein, $v_r = c\Delta\Phi/(4\pi(f_1+f_2))$, where c is the speed of light, $\Delta\Phi = \Delta\Phi_{order1} + \Delta\Phi_{order2}$, and $\Delta\Phi_{order1}$ and $\Delta\Phi_{order2}$ are determined using pulse pair algorithm and measurements obtained by $f_1/f_2$ and $f_2/f_1$ pulse pair as $\Delta\Phi_{order1} = \arg(E_{Rx,f1}(t)E^*_{Rx,f2}(t+\Delta T))$, and $\Delta\Phi_{order2} = \arg(E_{Rx,f2}(t)E^*_{Rx,f1}(t+\Delta T))$.

2. The method according to claim 1 wherein, said transmitting step includes transmitting two short pulses with center-frequencies of $f_1$ and $f_2$ in the order of $f_1$ and $f_2$ during a pulse repetition interval (PRI) and transmitting two short pulses with center-frequencies of $f_1$ and $f_2$ in the order of $f_2$ and $f_1$ during the next pulse repetition interval (PRI).

3. The method according to claim 1 wherein, $f_1$ and $f_2$ are frequencies ranging from 75 to 110 GHz, from 26.5 to 40 GHz, from 12 to 18 GHz or from 8 to 12 GHz preferably 9.6 GHz.

4. The method according to claim 1 wherein, the frequency separation between the center frequencies of $f_1$ and $f_2$ is from 2 MHz to 10 MHz.

5. The method according to claim 1 wherein, the time interval between the transmission of pulses $f_1$ and $f_2$ in the same pair ($\Delta T$) is in the range of from 10 microseconds and 100 microseconds.

6. The method of claim 1 wherein, $\tau$ is in the range of from 3 KHz to 6 KHz.

7. A method for operating a radar system, comprising:
   a. transmitting at least two pairs of pulses, each pair including center frequencies $f_1$ and $f_2$ and such that the order the pulses $f_1$ and $f_2$ are transmitted is reversed every alternate pair transmission;
   b. receiving a corresponding reflection signal as a reception signal after the at least two pairs of pulses are reflected by a point scatterer; and
   c. determining the mean radial velocity $v_r$ where $v_r = c\Delta\Phi/(4\pi(f_1+f_2))$, c is the speed of light, $\Delta\Phi = \Delta\Phi_{order1} + \Delta\Phi_{order2}$, and $\Delta\Phi_{order1}$ and $\Delta\Phi_{order2}$ are determined using pulse pair algorithm and measurements obtained by $f_1/f_2$ and $f_2/f_1$ pulse pairs as $\Delta\Phi_{order1}=\arg(E_{Rx,f1}(t)E^*_{Rx,f2}(t+\Delta T))$, and $\Delta\Phi_{order2}=\arg(E_{Rx,f2}(t)E^*_{Rx,f1}(t+\Delta T))$.

8. The method according to claim 7 wherein, said transmitting step includes transmitting two short pulses with center-frequencies of $f_1$ and $f_2$ in the order of $f_1$ and $f_2$ during a pulse repetition interval (PRI) and transmitting two short pulses with center-frequencies of $f_1$ and $f_2$ in the order of $f_2$ and $f_1$ during the next pulse repetition interval (PRI).

9. The method according to claim 7 wherein, $f_1$ and $f_2$ are frequencies ranging from 75 to 110 GHz, from 26.5 to 40 GHz, from 12 to 18 GHz or from 8 to 12 GHz preferably 9.6 GHz.

10. The method according to claim 7 wherein, the frequency separation between the center frequencies of $f_1$ and $f_2$ is from 2 MHz to 10 MHz.

11. The method according to claim 7 wherein, the time interval between the transmission of pulses $f_1$ and $f_2$ in the same pair ($\Delta T$) is in the range of from 10 microseconds and 100 microseconds.

12. A radar system, comprising:
  a. a transceiver configured to generate at least two pairs of pulses, each pair including center frequencies $f_1$ and $f_2$ and such that the order the pulses $f_1$ and $f_2$ are transmitted is reversed every alternate pair transmission;
  b. a radar antenna connected to the transceiver to (1) receive from the transceiver and transmit the at least two pairs of pulses and (2) receive and transmit to the transceiver a corresponding reflection signal after the at least two pairs of pulses are reflected by a point scatterer; and
  c. a digital receiver/processor connected to the transceiver to receive the reflection signals and configured to determine the mean radial velocity $v_r$ of the point scatterer from a transmitted waveform and received signal of frequency $f_1$ followed by a transmitted waveform and a received signal of frequency $f_2$ in a first pulse pair and a transmitted waveform and received signal of frequency $f_2$ followed by a transmitted waveform and a received signal of frequency $f_1$ in a second pulse pair where the first and second pulse pairs are transmitted in succession;

wherein, $v_r=c\Delta\Phi/(4\pi(f_1+f_2))$, where c is the speed of light, $\Delta\Phi=\Delta\Phi_{order1}+\Delta\Phi_{order2}$, and $\Delta\Phi_{order1}$ and $\Delta\Phi_{order2}$ are determined using pulse pair algorithm and measurements obtained by $f_1/f_2$ and $f_2/f_1$ pulse pair as $\Delta\Phi_{order1}=\arg(E_{Rx,f1}(t)E^*_{Rx,f2}(t+\Delta T))$, and $\Delta\Phi_{order2}=\arg(E_{Rx,f2}(t)E^*_{Rx,f1}(t+\Delta T))$.

13. The radar system according to claim 12, wherein the transceiver includes a digital waveform generator, the digital waveform generator configured to generate the pulses having center frequencies $f_1$ and $f_2$.

14. The radar system according to claim 12, wherein the digital receiver/processor includes a digital filter to separate the refection signals based on frequency.

15. The radar system according to claim 12 wherein, the transceiver is configured to generate two short pulses with center-frequencies of $f_1$ and $f_2$ in the order of $f_1$ and $f_2$ during a pulse repetition interval (PRI) and generate two short pulses with center-frequencies of $f_1$ and $f_2$ in the order of $f_2$ and $f_1$ during the next pulse repetition interval (PRI).

16. The radar system according to claim 12 wherein, $f_1$ and $f_2$ are frequencies ranging from 75 to 110 GHz, from 26.5 to 40 GHz, from 12 to 18 GHz or from 8 to 12 GHz preferably 9.6 GHz.

17. The radar system according to claim 12 wherein, the frequency separation between the center frequencies of $f_1$ and $f_2$ is from 2 MHz to 10 MHz.

18. The radar system according to claim 12 wherein, the time interval between the transmission of pulses $f_1$ and $f_2$ in the same pair ($\Delta T$) is in the range of from 10 microseconds and 100 microseconds.

\* \* \* \* \*